March 30, 1954

D. GOLD 2,673,631

MAGNETIC FLUID CLUTCH

Filed Nov. 15, 1949

INVENTOR.
DAVID GOLD
BY

March 30, 1954  D. GOLD  2,673,631
MAGNETIC FLUID CLUTCH
Filed Nov. 15, 1949  2 Sheets-Sheet 2

INVENTOR.
DAVID GOLD
BY

Patented Mar. 30, 1954

2,673,631

UNITED STATES PATENT OFFICE 2,673,631

MAGNETIC FLUID CLUTCH

David Gold, Washington, D. C.

Application November 15, 1949, Serial No. 127,475

3 Claims. (Cl. 192—21.5)

(Granted under Title 35, U. S. Code (1952), sec. 266)

The present invention relates to power control devices, and more particularly to such power control devices as clutches, differential clutches, brakes, and the like, comprising two elements whose faces are juxtaposed and spatially displaced from each other, wherein the desired control is obtained by effectuating a magnetically controlled coupling between the two surfaces.

It is known in the art that an effective power control device such as a magnetic differential clutch may be obtained by juxtapositioning driving and driven clutch members made of temporary magnetic material such as soft iron, interposing therebetween a suspension of powdered temporary magnetic material such as powdered soft iron in an oil medium, and applying a magnetic field thereto by means of an electrical coil properly positioned to afford the desired flux through the clutch members and the powdered material. In such a clutch, variations in the electric current applied to the coil result in commensurate variations in the magnetic flux produced, and the torque required for relative rotation between the two clutch members is approximately proportional thereto. Thus, if the driving clutch member is rotated at a constant speed and a given load is applied to the driven member, variations in the current applied to the electrical coil result in commensurate variations in the torque applied to the driven clutch member due to the variations in magnetic attraction thus afforded between the two clutch members and the particles suspended therebetween. While, if the driven clutch member of such a clutch is rigidly fixed in position, the device operates equally effectively as a magnetic brake. Clutches and brakes of this type are fully described in Technical Report 1213 of the National Bureau of Standards.

The present invention embodies the principles of such a power control device and constitutes an improvement thereof, wherein in its essential characteristics, in the clutch embodiment thereof, the rotation of the driving clutch member in the magnetic field produced by the field coil is utilized to amplify or increase the magnetic flux, thus enabling the control of a greater power by a given electric signal applied to the coil than has heretofore been obtainable with this general type of clutch. Therefore, where it is desired to control a large power output by means of a relatively small signal current by use of such a magnetic clutch as above-described, by employment of the present invention, with its amplification of the magnetic flux resulting from the application of the electric control signal to the field coil, the amplification of the signal current necessary for the desired power control is substantially reduced and in many instances may be eliminated. In the brake embodiment of the present device, as is the case in the above-described power control device of which the present invention is an improvement, the above-mentioned driven member is rigidly fixed in position.

It is therefore one object of the present invention to produce a magnetic power control device which operates to control the application of a relatively large amount of power in response to a relatively small magnetizing signal current, wherein relatively little or no amplification of the signal current is necessary to effectuate the desired control.

Another object of the present invention is to provide a magnetic power control device whose operation is varied in response to a magnetizing signal current, and wherein the magnetic flux produced by the signal current is amplified by the operation of the device.

Another object of the present invention is to provide a magnetic power control device whose operation is varied in response to a magnetizing signal current, and wherein the magnetic flux produced by the signal current is amplified by rotation of one coupling element of the device in the magnetic field resulting from the signal current.

Another object of the present invention is to provide a magnetic clutch whose operation is varied in response to a magnetizing signal current, and wherein the magnetic flux produced by the signal current is amplified by rotation of the driving clutch member in the magnetic field resulting from the signal current.

Another object of the present invention resides in the provision of such a magnetic power control device wherein one coupling member is constructed in part of temporary magnetic material and in part of electrically conducting material, so arranged that rotation of this member within the magnetic field resulting from the signal current generates a current in the electrical conducting portion thereof to produce an additional magnetic flux between two coupling members of the device.

A further object of the present invention is to provide such a magnetic power control device as indicated in the preceding paragraph which, when controlled by an alternating current signal, operates as in induction generator when the speed of rotation of the coupling member comprising electrically conducting and magnetizable material exceeds the synchronous speed for the pole configuration of the signal produced exciting field, to present essentially any desired impedance to the electric control signal, while simultaneously producing additional magnetic flux between two coupling members of the device.

A still further object of the present invention is to provide such a magnetic power control device in the form of a clutch, wherein the driving clutch member produces a localized magnetic flux functionally additive to the signal produced magnetic flux, which incorporates in its design the equivalent of electrical feedback damping by use of the magnetic hysteresis effect obtained in the driven cylinder, so that when a large speed differential exists between the driving and driven clutch members the hysteresis effect of the driven member to the magnetic flux produced by the driving member approaches a maximum, and when this speed differential is small the hysteresis effect approaches a minimum. Thus, the effective magnetic flux amplification by the clutch is reduced as the impressed control signal is reduced, and the effective amplification is increased as the control signal is increased.

Other objects and advantages of the present invention will become apparent to those skilled in the art from a consideration of the following detailed description thereof made in conjunction with the accompanying drawings, in which like numerals refer to the same or corresponding parts, and wherein.

Figure 1:
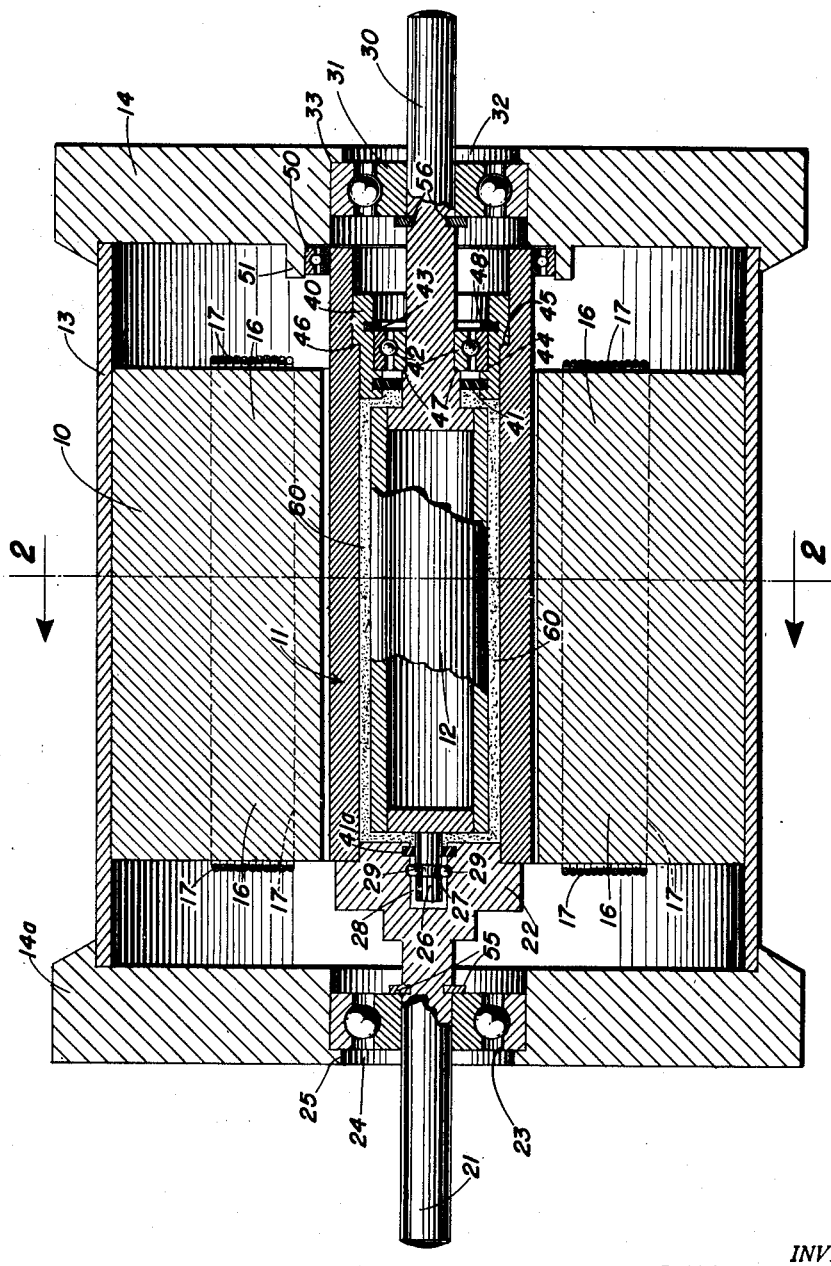
Fig. 1 is a longitudinal sectional view of a magnetic clutch embodying the principles of the present invention.

In the differential magnetic clutch embodiment of the present invention shown in the drawings, there is disclosed a substantially annular field magnet 10 of temporary magnetic material such as laminated soft iron, one coupling element shown as a middle cylinder 12 likewise of temporary magnetic material, and another coupling element shown as a central cylinder 11, positioned between the middle cylinder and the field annulus 10, composed in part of a temporary magnetic material and in part of an electrical conducting material such as aluminum or copper. The field annulus 10 is supported by the cylindrical casing 13 which in turn carries the end caps 14 and 14a for holding the various elements of the present clutch in the desired relative positions. The field annulus 10 is further provided with a plurality of slots 15 formed in its inner surface, Fig. 2, providing the various pole pieces 16 and 16a and enabling a coil to be wound about each pole piece as indicated by the numerals 17 and 17a.

Figure 2:
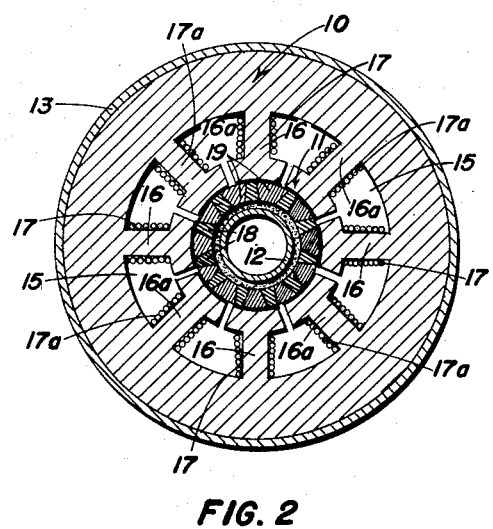
Fig. 2 is a reduced cross-sectional view of the magnetic clutch taken therethrough along line 2—2 of Fig. 1.

The central cylinder 11 is formed from a cylinder of electrically conducting material in which longitudinal slots are formed and strips of temporary magnetic material 19 are inserted therein, thus forming a squirrel cage type rotor comprising a plurality of longitudinally extending electrically conducting bars 18 tied together at each end by the rings 20, but having strips or bars 19 of temporary magnetic material interposed between the electrically conducting bars 18. It will be understood that the magnetic bars 19 may be either of homogeneous, laminated, or sintered powder construction, as may be desired. This cylinder is affixed at one end to the driving shaft 21 by means of the adapter coupling 22, while the driving shaft is provided with a ball bearing race 23 affixed thereto which is fitted into the circular opening 24 in the end cap 14a and abuts the shoulder 25 extending into the circular opening, thus providing a rotatable mounting for the driving shaft and central cylinder. In Fig. 2, the central cylinder 11 is shown comprising eleven bars 19 of magnetic material and eleven bars 18 of electrically conducting material, and the field annulus is shown comprising 8 poles 16 and 16a. It is desired to point out that the relationship of number of bars to pole pieces is purely a matter of choice, and operation of the device is independent of the particular relationship chosen.

The middle cylinder 12 is likewise formed of temporary magnetic material and is concentrically positioned within the central cylinder 11. One end of this middle cylinder is supported on a stub shaft 26 which enters the opening 28 provided therefor in the driving shaft adapter coupling 22 and is rotatably supported therein by the ball bearings 29 contained in the race 27. The other end of the middle cylinder 12 is affixed to the driven shaft 30, which like the driving shaft 21 has the ball bearing race 31 affixed thereto and designed to fit into the circular opening 32 formed in the end cap 14 to abut the shoulder 33 extending into the circular opening.

Inwardly along shaft 30 from the bearing race 31, another bearing race 42 is keyed to this shaft which abuts the shoulder 47 formed on said shaft. An annular liquid seal element 41 is positioned about the driven shaft 30 and is carried by element 40 which is positioned about the ball bearing race 42 by abutment of the shoulder 44 thereon with the inner edge of the race 42, while an annular groove 48 is provided in element 40 for receiving the split ring 43 which engages the opposite edge of the ball bearing race 42. Thus, with the bearing race 42 keyed to the shaft 30, the element 40 is fixed against longitudinal slippage by engagement of shoulder 44 and split ring 43 with opposite edges of the race. The free end of the central cylinder 11 is formed with shoulder 46 which engages flange 45 formed on the element 40 when the central cylinder is properly positioned in place. To prevent relative axial movement of the driving and driven shafts and their associated cylinders, the shafts 21 and 30 are further provided with the split rings 55 and 56, respectively: split ring 55 cooperating with the bearing race 23 and the shoulder 46, formed on the central cylinder 12, abutting the flange 45 formed on the element 40 prevent longitudinal slippage of the driving shaft and the central cylinder; while split ring 56 cooperating with the race 31 and the race 42 abutting the shoulder 44 on element 40 prevent longitudinal slippage of the middle cylinder. In addition, end cap 14 carries the ball bearing race 50, by means of the annular shoulder 51 extending inwardly from the cap, which engages the free end of the central cylinder 11 to provide a suitable bearing and support therefor.

With the clutch properly assembled, the central cylinder 11 is positioned within the tubular opening in the field annulus 10 and a small air gap is provided therebetween, while the middle cylinder 12 is centrally positioned within the central cylinder 11 and the space therebetween is filled with particles of temporary magnetic material 60, such as soft iron, suspended in a fluid medium, such as oil or the like, and is maintained within the enclosure there formed by the fluid seals 41 and 41a.

Figure 4:
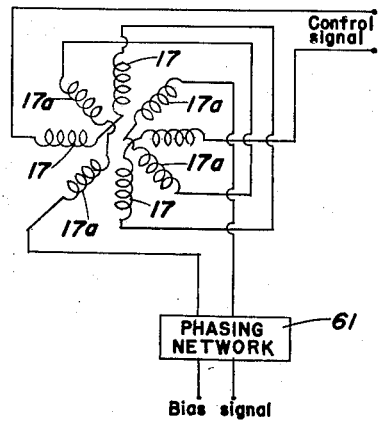
Fig. 4 is a wiring diagram of the present magnetic clutch showing the coil windings for the various field pole pieces.
Figure 3:
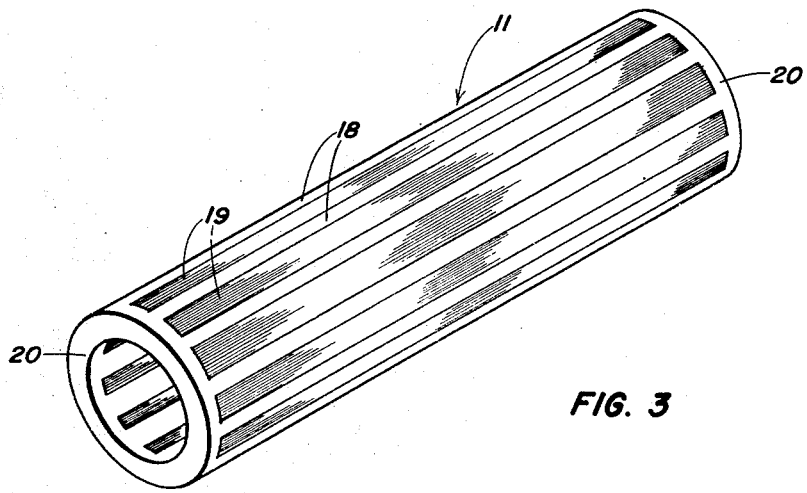
Fig. 3 is an isometric view of the driving clutch member.

Thus, if a control signal current is applied to the coils 17 by means of the circuit shown in Fig. 4, a magnetic flux is produced between successive pole pieces 16 wound by the coils 17. As indicated by Fig. 4, it is preferable that provision be made for the application of a bias signal to each of the coils 17a, alternately positioned between coils 17, the purpose and application of which will be discussed in a subsequent portion of this specification; thus, only every other pole piece of the field annulus, as indicated by the numerals 16, is affected by the control signal current. Therefore, if the driving shaft 21 and the central cylinder 11 coupled thereto are driven at a substantially constant speed by a suitable power source and a control signal current is applied to the field coils 17, the magnetic flux produced between the alternate pole pieces 16 magnetizes the bars of magnetic material 19 in the central cylinder 11, the middle cylinder 12, and the powdered magnetic material 60 suspended between the two cylinders, thereby producing a coupling drag between the central and middle cylinders and causing a rotation of the driven shaft 30 as the middle cylinder 12 is caused to follow the central cylinder 11. An increase or decrease in the control signal current results in a corresponding increase or decrease in this coupling drag between the two cylinders. Thus, for a given load on the driven shaft 30, variations in the control signal current, which result in corresponding variations in the magnetic flux produced by the field windings 17, cause corresponding variations in the differential of rotational speed between the driving shaft 21 and the driven shaft 30 and their respective cylinders.

Assuming for the present that the control signal current applied to the field windings 17 is D. C. current, as the central cylinder 11 is rotated at a constant speed by the driving shaft 21, the electrically conductive bars 18 formed on this cylinder cut the lines of force produced by the magnetic fields between successive pole pieces 16, thereby inducing short circuit currents through the electrically conductive squirrel cage portion of the central cylinder 11. The currents thus induced in turn produce localized magnetic flux increases through the bars 19 of the cylinder 11, through the middle cylinder 12, and through the particles of magnetic material suspended between the two cylinders, thus functionally supplementing the magnetic flux produced by the control signal current and causing a greater torque to be exerted upon the middle cylinder than would result from the magnetic flux produced solely by the control signal current. Therefore, for a given rotational speed of the driving shaft 21, for a given speed of the driven shaft 30, and for a given D. C. control current in the field coils 17, a greater torque is exerted upon the middle cylinder and a greater power output is controlled by the present differential clutch than can be accomplished by the magnetic clutches previously available, such as that described in the introduction to the present specification.

If an A. C. control signal current is applied to the field coils 17 and if the driving shaft 21 is rotated at a speed exceeding the synchronous speed of rotation of the pole configuration, and in the direction of pole rotation when polyphase signal current is employed, as in the case of D. C. current, short circuit currents are produced in the electrically conductive squirrel cage portion of the central cylinder 11 by the cutting of the magnetic lines of force produced by the field coils 17, resulting in localized magnetic flux increases functionally additive to the flux resulting from the control signal current, to accomplish the same effect as is obtained from D. C. signal current operation described above. If the hereinabove stated conditions for rotation of cylinder 11 are adhered to, in addition to the additional magnetic flux obtained, the present clutch operates as an induction generator upon the control signal line to present essentially any desired impedance to the control signal, thereby obtaining the additional desirable effect of decreasing the power drawn from the control signal source in the same manner as the operation of a conventional induction generator. To obtain these effects with an A. C. signal current, the central cylinder 11 must be rotated at a speed exceeding that of the synchronous speed of rotation of the pole configuration of the field annulus 10, and in the direction of pole rotation when polyphase signal current is employed, for if the speed of the cylinder 11 is less than the synchronous speed for the pole configuration or in the opposite direction from pole rotation, the drag exerted by the field on the central cylinder is wasted power decreasing the available control power contrary to the result desired.

A further desirable characteristic obtained by the magnetic clutch herein described is the equivalent of electrical feedback damping resulting from the magnetic hysteresis of the magnetic material used in the middle cylinder of the present clutch. Under A. C. or D. C. control signal current operation, when the rotational speed of the central cylinder 11 is in excess of the rotational speed of the middle cylinder 12, the additive magnetic field produced by the central cylinder rotates about the middle cylinder, and due to magnetic hysteresis the direction of the magnetism carried by the middle cylinder lags behind the rotating magnetic field produced by the central cylinder, the degree of lag being a function of the hysteresis characteristics of the magnetic material employed. It is apparent, therefore, that when the speed differential existing at any moment between the central and middle cylinders is great, the lag of the direction of magnetism in the magnetic material of the middle cylinder with respect to the magnetic field impressed thereon by the currents generated in the central cylinder is correspondingly great, and conversely, as these two cylinders approach synchronous speed this lag approaches zero. When the direction of magnetism in the middle cylinder is opposed to the direction of the magnetic field being impressed thereon by the electrically conductive portion of the central cylinder, the resultant effect is to reduce the magnetic attraction between the middle and central cylinders caused by the additional magnetic flux. Therefore, when it is desired to obtain a rapid rotation of the driven shaft 30, the middle and central cylinders approach synchronous speeds of rotation, and the above-described hysteresis effect approaches zero to result in a maximum magnetic attraction between the middle and central cylinders; while when a slow speed of rotation of the driven shaft 30 is desired, the rotational speed differential between the central and middle cylinders is great, resulting in a maximum hysteresis effect and tending to minimize the magnetic attraction between the central and middle cylinders.

This equivalent of electrical feedback damping is of particular significance when the present clutch is used, for example, in a servo system wherein the magnitude of the control signal current is determined by the position of the load as controlled by the driven shaft 30, so that as the desired position of the load is obtained the control signal current approaches zero. In such a system, at the outset of operation a relatively large control signal current is applied to the field coils 17, thus causing the rotational speed of the central cylinder 11 to approach synchronism with the rotational speed of the middle cylinder 12, resulting in minimum magnetic hysteresis effect to obtain a maximum benefit from the additive magnetic field produced by the central cylinder 11. However, as the desired position of the load is approached, the control signal current applied to the field coils 17 approaches a minimum, thus causing the speed differential between the central and middle cylinders to approach a maximum, resulting in a maximum hysteresis effect. Thus, when a rapid rotational speed of the driven shaft 30 is desired, the additive magnetic effect obtained from the central cylinder 11 approaches a maximum, but as it is desired to decrease the rotational speed of the driven shaft 30, the additional magnetic field produced by the central cylinder is partially cancelled, thereby further decreasing the magnetic attraction between the two cylinders than would correspond to the signal current decreases, resulting in an effect upon the magnetism which is the equivalent of electrical feedback damping and affording greater stability in the operation of the present clutch. It is well known that widely varying hysteresis characteristics are obtained from different magnetic materials; therefore, by choosing a magnetic material having the desired characteristics for the middle cylinder of the present clutch, a desired hysteresis effect and resultant damping characteristic may be obtained.

As mentioned earlier in the specification, alternate pole pieces on the field annulus 10, designated by the numerals 16a, are wound with a coil 17a supplied with a bias signal current. Depending upon the particular structure employed in assembling a clutch embodying the principles of the present invention and the resultant friction losses and inertia obtained thereby, upon the air gap between the field annulus 10 and the central cylinder 11, and upon the electrical and magnetic characteristics of the various elements employed and the resultant losses therefrom, a certain portion of the control signal current would be utilized in overcoming these characteristics and losses rather than operating to control the power transmitted by the clutch. Although these characteristics and losses may be counteracted by superimposing a bias signal directly on the control signal current, in the preferred embodiment of the present invention a separate bias signal circuit is provided which comprises a desired bias signal source, a variable phasing network 61, and the bias signal field coils 17a. Thus, by properly adjusting the bias signal current source and the phasing network, a magnetic field may be applied to the central and middle cylinders by means of the bias signal field coils 17a which just overcomes the frictional, electrical, magnetic, and other like losses and the inertia resulting from the particular construction of the clutch employed, thereby enabling the control signal current to be utilized fully and entirely in controlling the power transmitted by the clutch.

Although herein described by one specific embodiment, it is not intended to limit the scope of the present invention thereto, for modifications thereof within the spirit and scope of the appended claims will be apparent to those skilled in the art.

The differential clutch herein described can be readily modified and adapted to other uses, as for example to serve as an "on-off" clutch or as a brake. To serve as an "on-off" clutch, the control signal current circuit may be designed to provide either zero signal current or a sufficient current to lock the driving and driven members into a one to one ratio of rotational speeds. In this application, since the inertia and losses are not critical, the bias signal circuit may be eliminated. To serve as a brake, the middle cylinder's shaft is fixed against rotation, so that on application of a signal current the magnetic attraction between the two cylinders operates to decrease or stop the rotational speed of the central cylinder and its shaft. Where fine braking control is not desired, the bias signal circuit may be eliminated. Other uses of the present power control device and modifications thereof to adapt it thereto will be apparent to those skilled in the art, and such uses and modifications as are within the spirit and scope of the appended claims are intended to be covered in this specification and the appended claims.

Thus, there is here provided a magnetic power control device operating to control the torque between two control surfaces through a variable magnetic coupling drag established between said two surfaces, wherein the control power, as constituted by a control current signal, is amplified by utilization of induced currents resulting therefrom for a D. C. control current and of an induction generator principle for an A. C. control current.

The invention described herein may be manufactured and used by or for the Government of the United States of America for governmental purposes without the payment of any royalties thereon or therefor.

What is claimed is:

1. A magnetic power control device comprising a plurality of control field coils, a plurality of biasing coils, a driven cylinder of magnetic material, a driving cylinder cupped about said driven cylinder and interposed between said driven cylinder and said biasing and control coils, said cylinders being mounted for relative rotation with respect to said coils, and particles of magnetic material suspended between said driven and driving cylinders, said driving cylinder comprising a portion of non-magnetic electrically conducting material and a portion of magnetic material, application of current to said control field coils magnetizing said driven cylinder, said particles, and the magnetic material portion of said driving cylinder to control the torque between said cylinders through a variable coupling drag afforded by said particles, rotation of said driving cylinder in the magnetic field thus produced resulting in an additional magnetic flux through said driven cylinder, said particles, and the magnetic material portion of said driving cylinder for direct field coil current and acting as an induction generator rotor for alternating field coil current, and application of a biasing current to said biasing coils also producing a magnetic field through said driven cylinder, said particles, and said magnetic material portion of said driving cylinder to overcome the inertia of and losses in said clutch.

2. A magnetic power control device comprising a plurality of magnetic field poles, a driven cylinder of magnetic material coupled to a driven shaft, a driving cylinder coupled to a driving shaft, cupped about said driven cylinder, and interposed between said driven cylinder and said field poles, said cylinders being mounted for relative rotation with respect to said poles, said driving cylinder comprising an electrically conductive squirrel cage type rotor, said rotor including circumferentially spaced non-magnetic conducting elements to define circumferentially spaced slots, said rotor further including non-magnetic conducting members integral with and interconnecting said conducting elements, magnetic bars positioned in the slots defined by said conducting elements, and particles of magnetic material suspended between said two cylinders, said field poles operating to magnetize said driven cylinder, said particles, and said magnetic material positioned in said slots to control the torque between said cylinders through a variable coupling drag afforded by said particles, and rotation of said driving cylinder through the magnetic field produced by said field poles operating to produce an additional magnetic flux to further magnetize said driven cylinder, said particles, and said magnetic material positioned in the slots of said driving cylinder.

3. A power control device comprising means for producing a magnetic field variable in response to a variable signal control current source, a driven coupling member of magnetic material, a driving coupling member comprising circumferentially spaced non-magnetic conducting elements to define circumferentially spaced slots, said driving coupling member further including non-magnetic conducting members integral with and interconnecting said conducting elements, magnetic bars positioned in the slots defined by said conducting elements, said coupling members being mounted for relative rotation with respect to said field producing means, and particles of magnetic material interposed between said coupling members, said magnetic field controlling the torque between said cylinders through variable coupling drag afforded by said particles, variations in said magnetic field resulting in corresponding variations in said torque, rotation of said driving member in said magnetic field operating to amplify said magnetic field for direct current signals and functioning as an induction generator rotor for alternating current signals.

DAVID GOLD.

References Cited in the file of this patent

UNITED STATES PATENTS

| Number | Name | Date |
|---|---|---|
| 711,300 | Earle | Oct. 14, 1902 |
| 1,227,185 | Neuland | May 22, 1917 |
| 2,330,991 | Newton | Oct. 5, 1943 |
| 2,334,976 | Winther | Nov. 23, 1943 |
| 2,488,827 | Pensabene | Nov. 22, 1949 |
| 2,490,789 | Ellis | Dec. 13, 1949 |
| 2,525,571 | Winther | Oct. 10, 1950 |

FOREIGN PATENTS

| Number | Country | Date |
|---|---|---|
| 485,591 | Belgium | Nov. 13, 1948 |